United States Patent
Sato et al.

[11] Patent Number: 5,806,896
[45] Date of Patent: Sep. 15, 1998

[54] FLUID TRANSPORT PIPE JOINT

[75] Inventors: Taichi Sato, Nagaokakyo; Masaru Ueno, Aeyagawa; Mitsuhiro Shiozaki, Seita; Naoki Kaido, Osaka; Atsushi Sakai, Taki-gun, all of Japan

[73] Assignee: Sato et al., Japan

[21] Appl. No.: 625,414

[22] Filed: Mar. 29, 1996

[30] Foreign Application Priority Data

Feb. 5, 1996  [JP]  Japan ................................. 8-019003

[51] Int. Cl.⁶ .................................................. F16L 35/00
[52] U.S. Cl. ................................... 285/2; 285/4; 285/23; 285/24; 285/133.3; 285/197; 285/261; 285/373; 285/404
[58] Field of Search .................................. 285/261, 264, 285/404, 325, 2, 3, 4, 197, 133.3, 23, 24, 373

[56] References Cited

U.S. PATENT DOCUMENTS

| 3,276,796 | 10/1966 | Daniel | 285/261 |
| 3,433,504 | 3/1969 | Hanes | 285/264 X |
| 3,515,414 | 6/1970 | Kowalewski | 285/261 X |
| 3,840,255 | 10/1974 | Daghe | 285/197 X |
| 4,351,352 | 9/1982 | Meisenheimer | 285/2 X |
| 4,712,814 | 12/1987 | Petterson | 285/325 |
| 4,961,597 | 10/1990 | Bowen | 285/197 X |
| 5,129,681 | 7/1992 | Yono et al. | 285/264 X |
| 5,257,739 | 11/1993 | Pascara | 285/197 X |

FOREIGN PATENT DOCUMENTS

| 32938 | 8/1971 | Australia . | |
| 0121322 | 2/1984 | European Pat. Off. . | |
| 2257847 | 8/1975 | France . | |
| 2305676 | 10/1976 | France . | |
| 1811610 | 6/1970 | Germany | 285/197 |
| 2208288 | 8/1973 | Germany | 285/261 |
| 72070 | 4/1953 | Netherlands | 285/261 |
| 1392228 | 7/1973 | United Kingdom . | |
| WO9427081 | 11/1994 | WIPO . | |

Primary Examiner—Dave W. Arola
Attorney, Agent, or Firm—Webb Ziesenheim Bruening Logsdon Orkin & Hanson, P.C.

[57] ABSTRACT

A joint for a fluid transport pipe is provided for use in e.g. connecting and communicating a fluid piping device such as a branch pipe or a sluice valve to a through bore defined in a fluid transport pipe. The joint includes a joint body, to be connected to a fluid transport pipe. This joint body has a cylindrical connecting portion projecting therefrom. The cylindrical connecting portion includes a fixed cylindrical member formed integrally with the joint body and a movable cylindrical member fluid-tightly connectable to the fixed cylindrical member to be pivotable three-dimensionally relative thereto.

23 Claims, 12 Drawing Sheets

FLUID TRANSPORT PIPE JOINT

BACKGROUND OF THE INVENTION

1. Field of the Invention

The present invention relates to a joint for a fluid transport pipe for use in e.g. connecting a fluid piping device such as a branch pipe or a sluice valve between opposed terminal ends of two fluid transport pipes so as to communicate with through bores defined in peripheral walls of the respective fluid transport pipes, and more particularly to a fluid transport pipe joint having a cylindrical connecting portion projecting from a body of the joint.

2. Description of the Related Art

A conventional fluid transport pipe joint is shown in FIG. 17. As shown, this joint to be connected with a fluid transport pipe P includes three split joint members B1, B2 and B3 to be fitted around a peripheral wall 50 of the fluid transport pipe P, with the split joint members B1, B2 and B3 being rigidly connected with each other by means of bolts 51 and nuts 52. The first split joint member B1 opposed to a through bore 50a defined in the peripheral wall 50 of the pipe integrally includes, as an integral projection, a cylindrical connecting portion 53 for communicating with the through bore 50a in a direction normal to an axis X of the fluid transport pipe P. Further, this cylindrical connecting portion 53 integrally includes, at a leading end thereof, a connecting flange 53A to which the above-mentioned fluid piping device such as a branch pipe or a sluice valve is to be connected.

Each of the split connecting members B1, B2 and B3 is engaged with and retained by an elastic sealing element 54 for fluid-tightly sealing a gap formed with the outer peripheral wall 50 of the pipe as well as the connecting portions between these split connecting members B1, B2 and B3 adjacent in the peripheral direction of the pipe so as to prevent leakage of fluid from the through bore 50a.

However, with this conventional pipe joint, the first split connecting member B1 and the cylindrical connecting member 53 are integrally formed by means of casting. Therefore, with occurrence of an earthquake or differential setting due to poor or soft ground, the connection between the first split connecting member B1 and the cylindrical connecting portion 53 may be subject to a significant external force (such as a bending moment) effective in a direction transverse to an axis Y of the cylindrical connecting portion 53 (a shearing direction), so that the connection may be broken or damaged.

Then, in order to restrict the possibility of such damage or breakage in the connection due to an earthquake or differential settlement, the construction of FIG. 17 provides that the connecting flange 53A of the cylindrical connecting portion 53 of the first split joint member B1 is fixedly connected, by means of bolts 55 and nuts 56, with a flexible joint C which is omni-directionally pivotable relative to the connecting flange 53A, i.e. to the joint member B1.

Referring more particularly to this flexible joint C, this flexible joint C includes: a receiver pipe portion 57 having, at an end thereof, a connecting flange 57A corresponding to and to be connected with the connecting flange 53A of the first split joint member B1; and an inserting pipe member 58 having a connecting flange 58A inserted into the receiver pipe portion 57 and having, at a distal end thereof, an inserting pipe portion 58B to be connected with the external piping device. The inserting pipe portion 58B of the inserting pipe member 58 is formed as a partially spherical portion including a partially spherical, second sliding contact face 58a to come into slidable contact with a partially spherical, first sliding contact face 57a formed in an inner peripheral surface of the receiver pipe portion 57. Further, on the opening side of the first sliding face 57a of the receiver pipe portion 57, there are provided a sliding contact guide member 59 having a partially spherical third sliding face 59a for slidably and omni-directionally pivotably (i.e. flexibly), but not longitudinally slidably, guiding the inserting pipe portion 58B of the inserted inserting pipe member 58 along the first sliding contact face 57a of the receiver pipe portion 57, and a C-shaped stopper ring 60 fitted and retained within a first annular groove 57b defined on the opening side of the first sliding face 57a so as to prevent, through contact, inadvertent withdrawal of the sliding contact guide member 59 to the opening side.

Further, an annular elastic sealing member 61 is fitted and retained within a second annular groove 57c defined also in the first sliding contact face 57a of the receiver pipe portion 57, so that the sealing member 61 is pressed against the second sliding contact face 58a of the inserting pipe member 58.

Then, with the above-described construction connected with the flexible joint C, when a significant external force is exerted in the transverse direction (shearing direction) to the axis Y of the cylindrical connecting portion 53 due to an earthquake or differential settlement in the poor ground, the receiver pipe portion 57 and the inserting pipe member 58 may flex three-dimensionally along the sliding contact faces 57a, 58a, 59a, thereby to reduce the external force component in the shearing direction effective on the connection between the first split joint member B1 and the cylindrical connecting portion 53. Accordingly, it is possible to restrict the possibility of breakage such as a crack or damage at this connection.

However, according to the above construction, since the flexible joint C having the receiver pipe portion 57 and the inserting pipe member 58 is rigidly connected with the cylindrical connecting portion 53 of the first split joint member B1, this necessarily extends the distance between the axis X of the fluid transport pipe P and the distal connecting flange 58A of the inserting pipe member 58. As a result, this construction will impose undesirable restriction on the arrangement of the external piping device such as a branch pipe or a sluice valve. The construction will further lead to complexity and enlargement of the pipe installing operation due to increase of the volume of the earth to be dug at the site of piping installation as well as to increase in the number of components constituting the joint. These, as combined, result in undesirable increase of costs and the time period needed for the installation operation.

The present invention attends to the above-described state of the art and its primary object is to prevent the breakage or damage at the connection between the first split joint member and the cylindrical connecting portion due to application of an external force effective in the shearing direction during occurrence of an earthquake or differential settlement, without imposing the undesirable limitations on the arrangement of other external piping device and with minimizing the costs and time period needed for the installing operation of the piping.

SUMMARY OF THE INVENTION

For accomplishing the above-noted object, a fluid transport pipe joint, according to the features of the invention defined in the appended claim 1, comprises:

a joint body to be connected to a fluid transport pipe, the joint body including a cylindrical connecting portion projecting from the joint body;

wherein, the cylindrical connecting portion includes a fixed cylindrical member formed integrally with the joint body and a movable cylindrical member fluid-tightly connectable to the fixed cylindrical member to be pivotable three-dimensionally relative thereto.

With the above construction, when a significant external force occurs in the transverse direction (shearing direction) relative to the axis of the cylindrical connecting portion due to occurrence of an earthquake or differential settlement in poor ground, the fixed cylindrical member formed integral with the joint body and the movable cylindrical member flex three-dimensionally relative to each other so as to reduce the force component effective on the connection between the joint body and the cylindrical connecting portion. Accordingly, it is possible to restrict the occurrence of breakage or damage at this connection.

Further, in comparison with the conventional construction using the flexible joint interconnecting the receiver pipe portion and the inserting pipe portion pivotably relative to each other. The above construction of the present invention may reduce the distance between the axis of the fluid transport pipe and the distal end of the movable cylindrical member at least by an amount corresponding to the length of the receiver pipe portion. As a result, it is also possible to reduce the volume of the earth to be dug at the installment site as well as the number of the components constituting the entire joint. Consequently, it has become possible to achieve the above-mentioned primary object of the invention, i.e. to prevent the breakage or damage at the connection between the first split joint member and the cylindrical connecting portion due to application of an external force effective in the shearing direction during occurrence of an earthquake or differential settlement, without imposing the undesirable limitations on the arrangement of other external piping device and with minimizing the costs and time period needed for the installing operation of the piping.

According to one aspect of the invention, the joint body includes a plurality of split joint members to be fixedly connected with each other around a peripheral wall of the fluid transport pipe, a first split joint member of the joint members being disposed in opposition to a through bore defined in the peripheral wall of the transport pipe, said first split joint member integrally forming said fixed cylindrical member communicated with said through bore.

With the above construction, the fixed cylindrical member is formed integral with one of the joint members split along the peripheral direction of the pipe. Then, in comparison e.g. with a further construction in which the joint body is formed of a tubular member, the operation for connecting the movable cylindrical member to the fixed cylindrical member may be easy, whereby the entire assembly operation of the joint may be effected simply and efficiently.

According to a still further aspect of the invention, the movable cylindrical member to be connected with the fixed cylindrical member defines, in an outer peripheral face thereof, a first sliding contact face having a partially spherical shape; the fixed cylindrical member defines, in an inner peripheral face thereof, a second sliding contact face having a partially spherical shape for coming into slidable contact with the first sliding contact face; and stopper means is provided for preventing, through contact, inadvertent withdrawal of the movable cylindrical member from the fixed cylindrical member, while allowing the movable cylindrical member to be pivotably flexed relative to the fixed cylindrical member along the first and second sliding contact faces.

With the above construction, when a significant external force in the transverse direction (shearing direction) relative to the axis of the cylindrical connecting portion due to occurrence of an earthquake or differential settlement in poor ground, the fixed cylindrical member and the movable cylindrical member can smoothly flex three-dimensionally relative to each other along the partially spherical first and second sliding contact faces defined in the faces of these members contacting with each other. Therefore, even when such external force is applied suddenly, the occurrence of breakage or damage at the connection between the first split joint member and the cylindrical connecting portion may be effectively restricted.

According to a still further aspect of the invention, the movable cylindrical member has an axial length which is shorter than an inside diameter of the fixed cylindrical member; the movable cylindrical member has an entire outer peripheral face constituting the partially spherical first sliding contact face; the fixed cylindrical member defines, in an inner peripheral face thereof, the partially spherical second sliding contact face rotatably engageable with the first sliding face of the movable cylindrical member; the stopper means is constituted from an opened peripheral edge of the fixed cylindrical member having an inside diameter which is shorter than a maximum diameter of the first sliding contact face of the movable cylindrical member; and the opened peripheral edge of the fixed cylindrical member defines a cutout portion for allowing insertion of the movable cylindrical member toward the second sliding contact face only when the axis of the movable cylindrical member is oriented normal to the axis of the fixed cylindrical member and allowing the movable cylindrical member to be pivoted until the axis of the inserted movable cylindrical member comes into register with the axis of the fixed cylindrical member.

With the above construction, through the cutout portion defined at the opened peripheral edge of the fixed cylindrical member, the movable cylindrical member is inserted with the axis thereof being oriented normal to the axis of the fixed cylindrical member; and then, this inserted movable cylindrical member is pivoted until the axis thereof comes into register with the axis of the fixed cylindrical member. With these simple operations, a withdrawal displacement of the movable cylindrical member may be effectively prevented through contact with the opened peripheral edge of the fixed cylindrical member. Accordingly, the stopper means may be constructed simple. In addition, in the assembled condition in which the movable cylindrical member is inserted into and connected with the fixed cylindrical member, the entire or almost entire movable cylindrical member is positioned inside the fixed cylindrical member. So that, the distance between the through bore of the peripheral wall of the pipe and the distal end of the movable cylindrical member may be even shorter, thereby to provide greater freedom in the arrangement of the external piping device and also to further reduce the costs and time period needed for the pipe installing operation.

According to a still further aspect of the invention, the first sliding contact face is defined at an axial end portion of the outer peripheral face of the movable cylindrical member; the inside diameter of the fixed cylindrical member is set so as to allow axial withdrawal of the movable cylindrical member oriented coaxially with the fixed cylindrical member; in the inner peripheral face of the fixed cylindrical member and at a portion of the inner peripheral face co-extending from the second sliding contact face contacting the first sliding contact face of the movable cylindrical member, there are provided a sliding contact guide member having a partially spherical third sliding contact face for coming into slidable contact with the first sliding contat face of the movable cylindrical member and a stopper member for preventing, through contact, displacement of the sliding contact guide member toward the opening; and said sliding contact guide member and said stopper member together constitute said stopper means.

With the above construction, after the partially spherical first sliding contact face defined at the end of the movable cylindrical member is inserted along the axis of the fixed cylindrical member, the sliding contact guide member and the stopper member are assembled with the portion adjacent the opening co-extending from the second sliding contact face of the fixed cylindrical member. With these, it is possible to prevent withdrawal displacement of the movable cylindrical member from the fixed cylindrical member while allowing the pivotal flexion between the fixed cylindrical member and the movable cylindrical member along the two sliding contact faces.

Accordingly, the movable cylindrical member may have any desired shape at the other axial end thereof, which shape is suitable for connection of a particular external piping device. In this manner, this construction may provide even greater designing freedom, in comparison with the construction defined in the appended claim 4. Moreover, for disconnecting the movable cylindrical member from the fixed cylindrical member, this disconnecting operation is possible by removing the stopper member from the fixed cylindrical member, even with the movable cylindrical member kept connected with the external piping device. Hence, the manner of disconnecting operation may be freely chosen, depending on the particular operational requirements.

According to a still further aspect of the invention, the joint further comprises releasable temporary fixing means for temporarily fixing the movable cylindrical member to the fixed cylindrical member.

With this construction, the fixed cylindrical member and the movable cylindrical member together constituting the cylindrical connecting portion are rendered flexible three-dimensionally relative to each other. Further, in connecting the external piping device to the movable cylindrical member, the movable cylindrical member may be temporarily fixed to the fixed cylindrical member by means of the temporary fixing means. Therefore, it is not necessary to maintain, by e.g. a hand, the movable cylindrical member at the predetermined connecting posture, which member tends to incline downwards by the weight of its own. Thus, the connecting operation of the external piping device may be effected efficiently.

Preferably, the temporary fixing means effects the temporarily fixing operation with the movable cylindrical member and the fixed cylindrical member being oriented coaxially or substantially coaxially.

With the above construction, when the external piping device is connected to the movable cylindrical member temporarily fixed to the fixed cylindrical member, the movable cylindrical member and the fixed cylindrical member are located at a center position in the pivotal flexion range at which position the axes of these member are aligned with each other. Therefore, it is not necessary to adjust the connected postures of the movable and fixed cylindrical members after the connecting operation of the external piping device. Hence, the connecting operation of the external piping device may be effected further efficiently.

According to a still further aspect of the invention, the temporary fixing means includes a screw member threaded to the fixed cylindrical member, the screw member being capable of pressing the first sliding contact face of the movable cylindrical member, and a protector member interposed between a leading end of the screw member and the first sliding contact face of the movable cylindrical member, the protector member being softer than the first sliding contact face.

With the above construction, while the movable cylindrical member and the fixed cylindrical member may be reliably and firmly temporarily fixed relative to each other by means of the screw member, it is also possible to restrict damage to the first sliding face of the movable cylindrical member.

According to a still further aspect of the invention, the temporary fixing means includes a screw member threaded to the fixed cylindrical member, the screw member being capable of pressing the first sliding contact face of the movable cylindrical member, and this screw member includes a breakable portion which is breakable, when subjected to an external force tending to move the fixed cylindrical member and the movable cylindrical member relative to each other, so as to release the temporarily fixed condition between the movable cylindrical member and the fixed cylindrical member.

With the above construction, even if a worker forgets to release the temporarily fixed condition provided by the screw member after the external piping device is connected to the movable cylindrical member temporarily fixed to the fixed cylindrical member, with occurrence and application of a significant external force to the screw member due to occurrence of an earthquake or differential settlement in the poor ground, this external force breaks the breakable portion of the screw member, thereby to automatically release the temporarily fixed condition of the movable cylindrical member relative to the fixed cylindrical member.

For this reason, the above construction can eliminate the necessity of the releasing operation of the screw member operated for the temporary fixing. Therefore, the connecting operation of the external piping device may be effected still more efficiently.

According to a still further aspect of the invention, of the inner peripheral face of the movable cylindrical member, at least a portion thereof co-extending from the end on the side of the joint body is formed as a tapered face having a gradually increasing diameter towards the joint body; and this tapered face has a maximum inside diameter which is greater than the diameter of the through bore.

With the above construction, when the movable cylindrical member is pivotably flexed relative to the fixed cylindrical member, the end of the movable cylindrical member on the side of the joint body will not move at all or hardly move in the direction to reduce the cross sectional area of the fluid passage extending from the through bore to the movable cylindrical member. Accordingly, it becomes possible to restrict occurrence of pressure loss or turbulent fluid flow between the fixed cylindrical member and the movable cylindrical member.

Preferably, the protector member is constituted by a portion of an elastic sealing member for fluid-tightly sealing the gap formed between the opposed connected faces of the fixed cylindrical member and the movable cylindrical member.

With the above construction, it is possible to restrict damage to the first sliding contact face of the movable cylindrical member in the course of the temporary fixing operation using the screw member. In addition, as a portion of the elastic sealing member is utilized also as the protector member, the number of the components may be reduced and eventually the assembly operation may be further facilitated.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
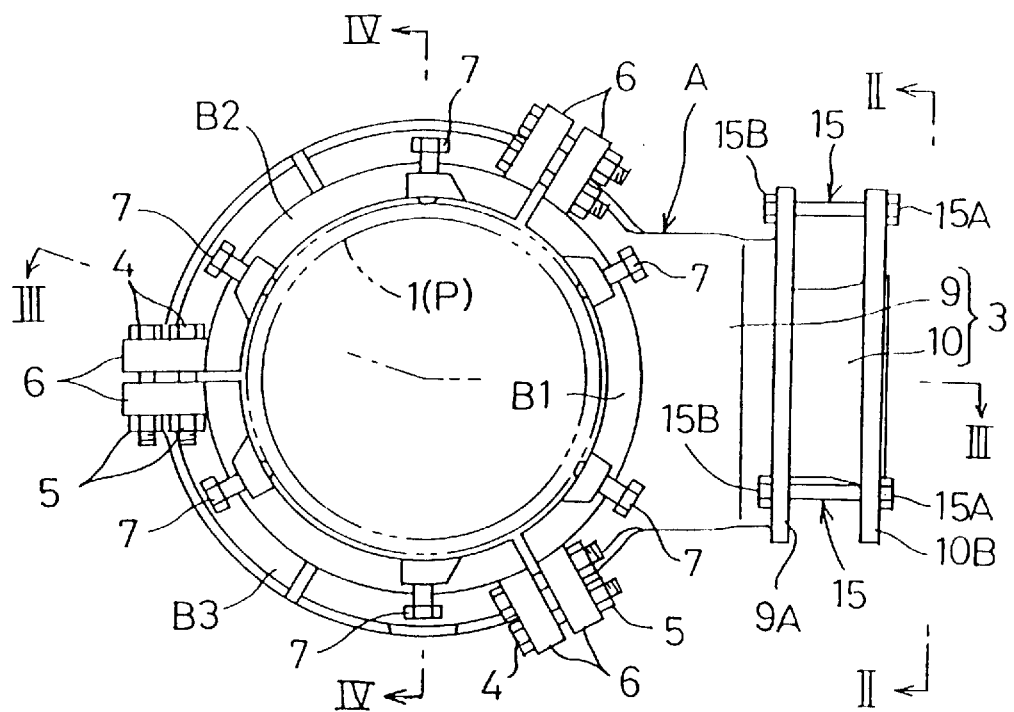
FIG. 1 is a side view of a fluid transport pipe joint relating to a first preferred embodiment of the invention.
Figure 2:
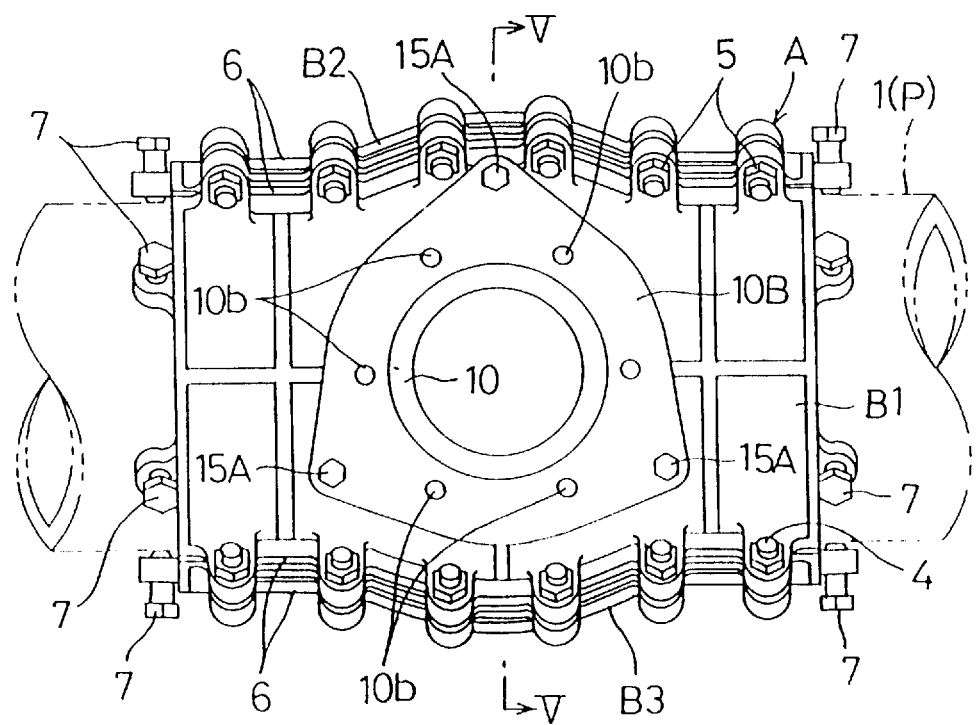
FIG. 2 is a perspective view taken along a line II—II in FIG. 1.
Figure 3:
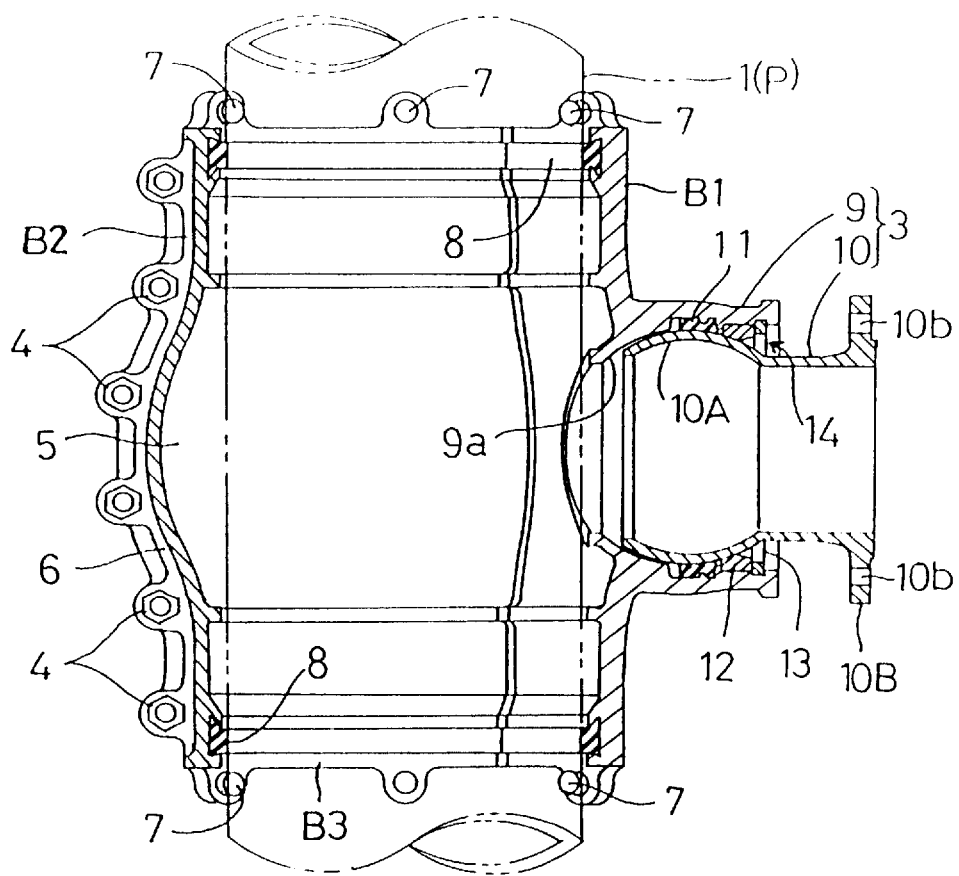
FIG. 3 is a section view taken along a line III—III in FIG. 1.
Figure 4:
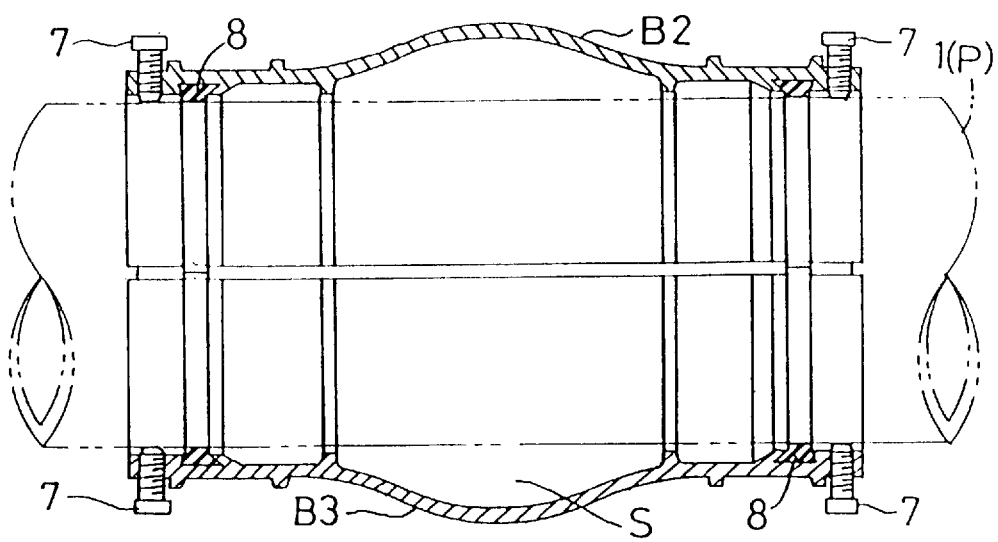
FIG. 4 is a section view taken along a line IV—IV in FIG. 1.

Preferred embodiments of a fluid transport pipe joint relating to the present invention will now be described in details with reference to the accompanying drawings.

First Embodiment

A fluid transport pipe joint shown in FIGS. 1 through 5 includes a joint body A made of cast iron to be connected with a fluid transport pipe P such as a water pipe formed of cast iron, and this joint body A includes three split joint members B1, B2 and B3 rigidly interconnected with each other around and along a peripheral wall 1 of the fluid transport pipe P (i.e. along the peripheral direction of the pipe). Of these split joint members, the first split joint member B1 disposed in opposition to a through bore 2 defined in the pipe peripheral wall 1 includes, as an integral outer projection thereof, a cylindrical connecting portion 3 communicated with the through bore 2 in the horizontal direction normal to an axis X of the fluid transport pipe P.

Each of the split joint members B1, B2 and B3 includes, at opposed peripheral ends thereof, there are formed, as integral radially outer projections, connecting flanges 6 to be rigidly connected with the adjacent connecting flanges 6 of the adjacent split joint members by means of bolts 4 and nuts 5. At opposed ends of the respective split joint members B1, B2, B3 in the direction of the axis X and at two positions spaced apart from each other in the peripheral direction, bolts 7 are threaded for maintaining the inner peripheral face of each split joint member B1, B2, B3 and an outer peripheral face of the pipe peripheral wall 1 with a predetermined distance therebetween. Further, each of the split joint members B1, B2, B3 defines a sealing groove within which there is fitted and retained an elastic sealing member 8 made of synthetic rubber material (e.g. styrene-butadiene rubber) for fluid-tightly sealing the gap between the inner peripheral face of the respective split joint members B1, B2, B3 and the outer peripheral face of the pipe peripheral wall 1 and also the gap between the connecting flanges 6 of the peripherally adjacent and interconnected split joint members B1, B2, B3, so as to prevent leakage of the fluid (e.g. tap water) from the through bore 2 to the outside.

Between the inner peripheral faces of the split joint member B1, B2, B3 and the outer peripheral face of the pipe peripheral wall 1, there is formed an annular space fluid-tightly (i.e. water-tightly) sealed by the elastic sealing members 8 and communicated with the through bore 2. Then, when the fluid present inside the fluid transport pipe P flows into the annular space S through the through bore 2, an even pressure is applied to the inner faces of the respective split joint members B1, B2, B3, whereby the contact pressure to each elastic sealing member 8 may be maintained substantially uniform.

The cylindrical connecting portion 3 includes a fixed cylindrical member 9 formed integral with the first split joint member B1 and a movable cylindrical member 10 formed of cast iron and three-dimensionally flexibly or pivotably connectable with the fixed cylindrical member 9. And, between the opposed connected faces of these fixed cylindrical member 9 and movable cylindrical member 10, there is interposed an elastic and annular sealing member 11 made of synthetic rubber material (e.g. styrene-butadiene rubber) for providing fluid or water-tightness therebetween.

Figure 5:
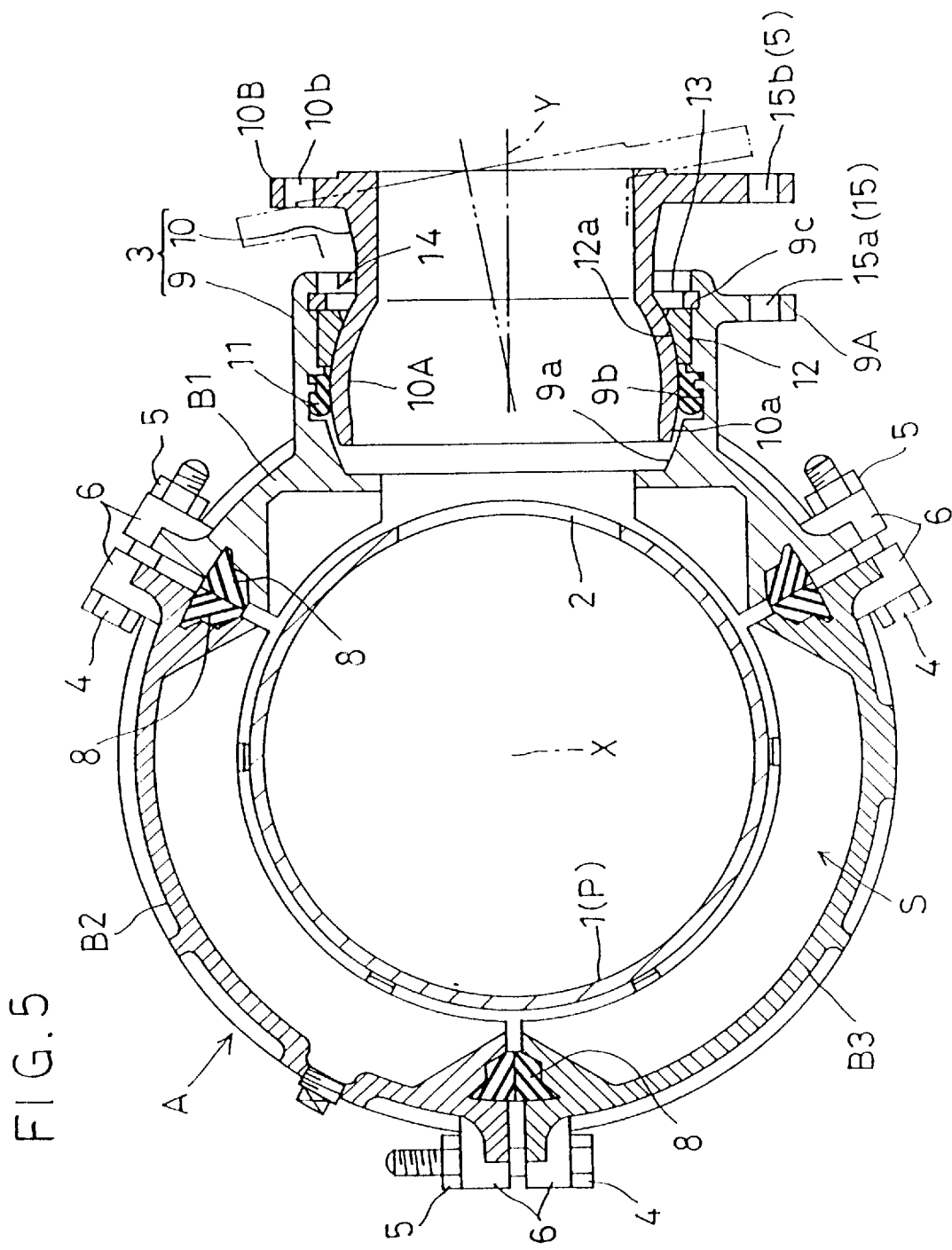
FIG. 5 is an enlarged section view taken along a line V—V in FIG. 1.

More particularly, as shown in FIG. 5, the movable cylindrical member 10 includes an end portion 10A in the direction of the axis Y thereof and this portion 10A is formed as a partially spherical portion projecting outwards in the radial direction. Further, this partially spherical portion 10A defines, in an outer peripheral face thereof, a partially spherical first sliding contact face 10a which comes into sliding contact with a second sliding contact face 9a defined in an inner peripheral face of the fixed cylindrical member 9. The fixed cylindrical member 9 has an inside diameter so determined as to allow insertion and withdrawal of the spherical portion 10A of the movable cylindrical member 10 oriented coaxial with the axis Y of this fixed cylindrical member 9.

Further, in the inner peripheral face of the fixed cylindrical member 9 and at a portion thereof adjacent the opening and co-extending from the second sliding contact face 9a coming into slidable contact with the first sliding contact face 10a of the movable cylindrical member 10, there are formed an annular sealing groove 9b for retaining the elastic sealing member 11 and an annular groove 9c for engaging and retaining a C-shaped stopper member 13. Between the elastic sealing member 11 and the stopper member 13, there is interposed a sliding contact guide member 12 formed of cast iron and defining a partially spherical third sliding contact face 12a which comes into slidable contact with the first sliding contact face 10a of the movable cylindrical member 10.

The sliding contact guide member 12 and the stopper member 13 together constitute stopper means 14 for preventing, through contact, withdrawal displacement of the movable cylindrical member 10 from the fixed cylindrical member 9, while allowing the pivotal flexion of the movable cylindrical member 10 relative to the fixed cylindrical member 9 along the sliding contact faces 9a, 10a, 12a.

At the other end of the movable cylindrical member 10 in the direction of the axis Y, there is integrally formed a connecting flange 10B including a series of coaxially arranged connecting through holes 10b for use in connection of an external piping device such as a branch pipe or a sluice valve. Further, between the fixed cylindrical member 9 and the movable cylindrical member 10, there is releasably disposed a temporary fixing means 15 for temporarily fixing or temporarily fixing the movable cylindrical member 10 to the fixed cylindrical member 9.

This temporary fixing means 15 forms a first attaching hole 15a in each of connecting tongues 9A projecting from three peripheral positions of the outer peripheral face of the fixed cylindrical member 9. On the other hand, in the connecting flange 10B of the movable cylindrical member 10 and at three peripheral positions thereof opposed to the first attaching holes 15a in the direction of the axis Y, there are formed second attaching holes 15b. Further, temporary fixing bolts 15A are inserted through the first and second attaching holes 15a, 15b opposed to each other in the direction of the axis Y. With these, by tightening nuts 15B threaded on the leading threaded ends of the temporary fixing bolts 15A, the movable cylindrical member 10 and the fixed cylindrical member 9 may be temporarily fixed to each other, with the axes thereof being substantially aligned with each other.

Then, after completion of the connecting operation of the external piping device to the connecting flange 10B of the movable cylindrical member 10, the temporarily fixed condition realized by means of the temporary fixing bolts 15A and the nuts 15B may be released.

Figure 6:
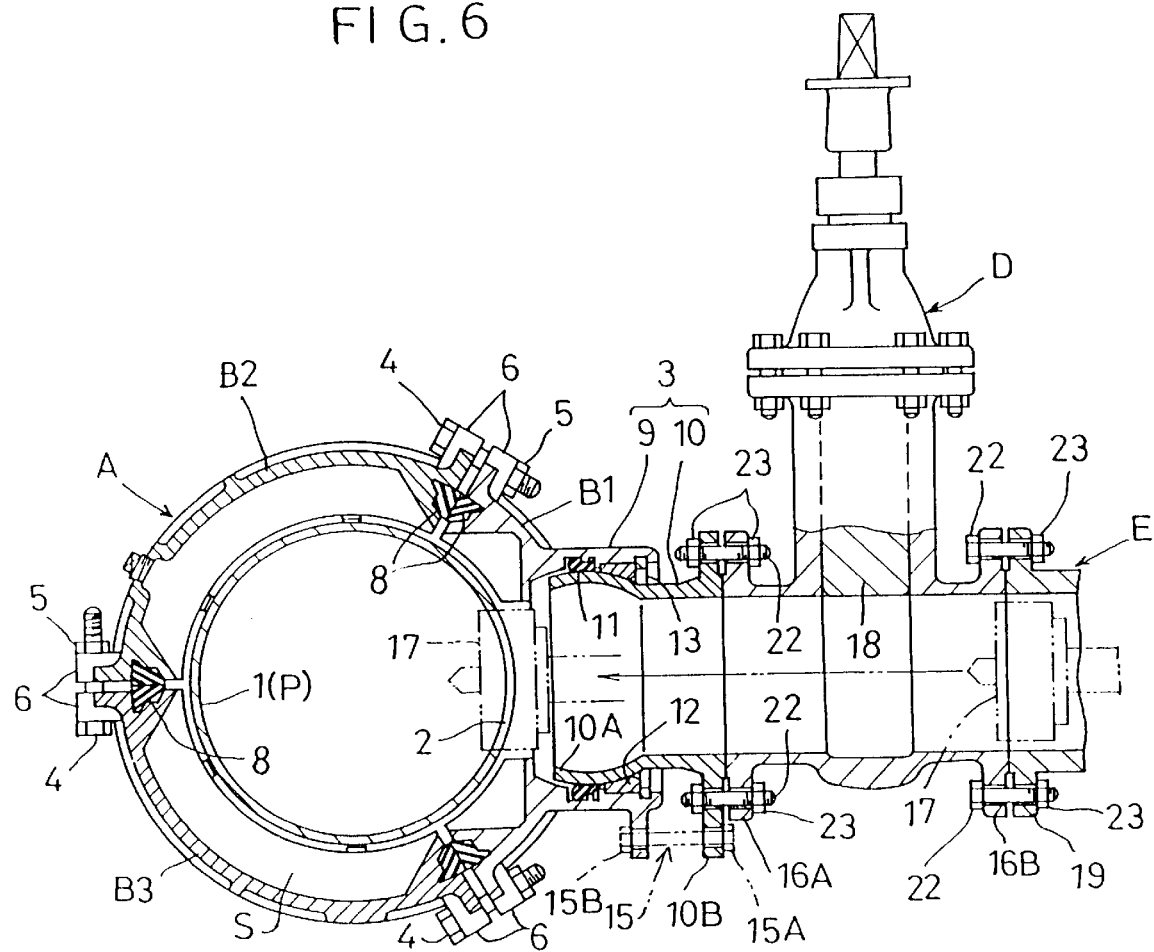
FIG. 6 is a partially cutaway side view showing a bored condition.

Incidentally, when the pipe joint of the invention is installed with cutting off the water supply by operating a valve device disposed at a predetermined position in the direction of the axis X of the fluid transport pipe P, the through bore 2 may be formed in the pipe peripheral wall 1 prior to this installment operation of the pipe joint. On the other hand, for forming the through bore 2 without cutting off the supply of the fluid such as tap water, as illustrated in FIG. 6, first, the joint of the invention is installed at a predetermined position of the fluid transport pipe P; and then, one connecting flange 16A of a sluice valve device D, which is an example of the external piping device, is rigidly connected, via bolts 22 and nuts 23, to the connecting flange 10B of the movable cylindrical member 10. Further, to the other connecting flange 16B of this sluice valve device D, a connecting flange 19 of a boring device E having a rotary cutter 17 is rigidly connected via bolts 22 and nuts 23.

Under the above condition, after a valve member 18 of the sluice valve device D is opened, the rotary cuter 17 of the boring device E is driven to rotate and advanced toward the fluid transport pipe P, so as to define the through bore 2 in the pipe peripheral wall 1.

After completion of the above boring operation, the rotary cutter 17 is rotatably retracted and the valve member 18 of the sluice valve device D is closed; and then the boring device E is detached and a branch pipe or the like, as a further example of the external piping device, may be connected to the other connecting flange 16B of the sluice valve device D.

Second Embodiment

Figure 7:
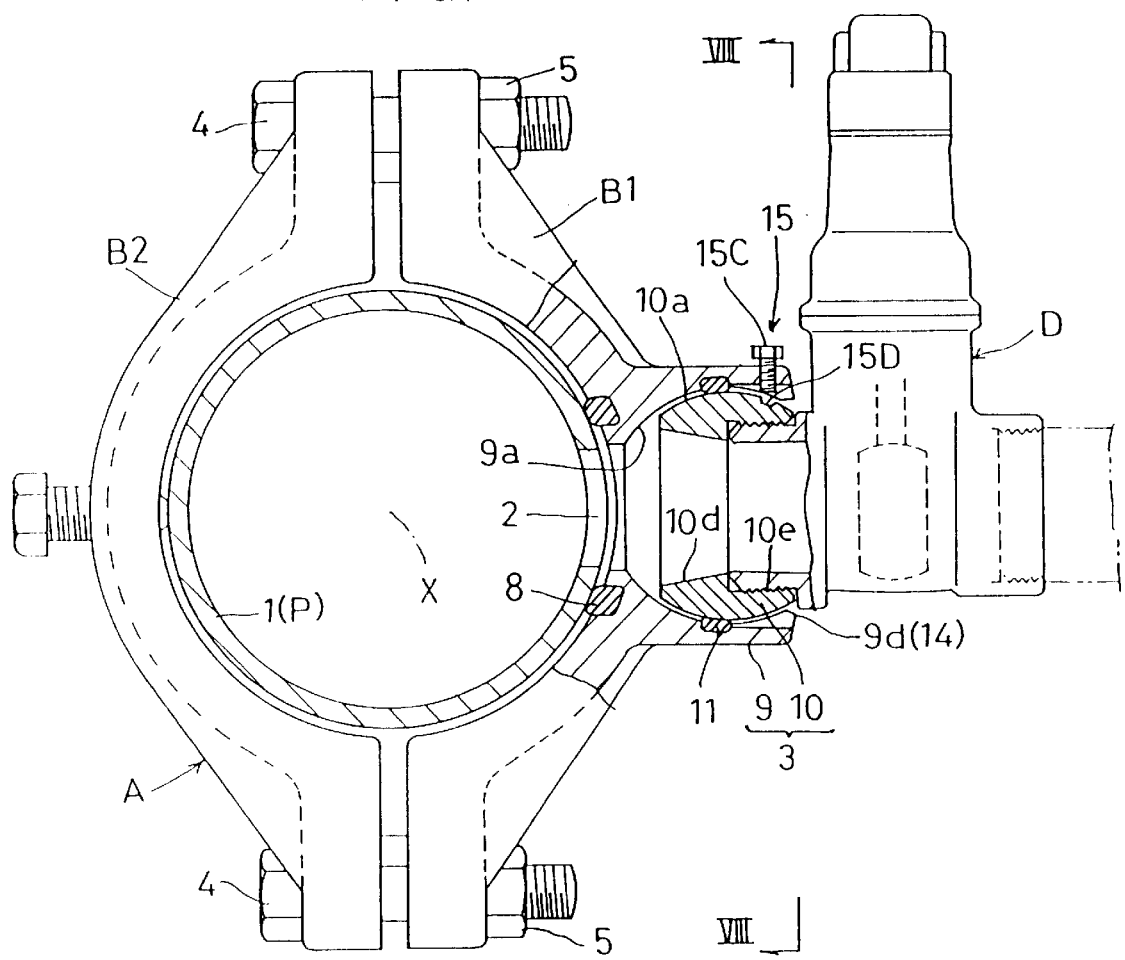
FIG. 7 is a partially cutaway side view showing a second embodiment of the invention.
Figure 8:
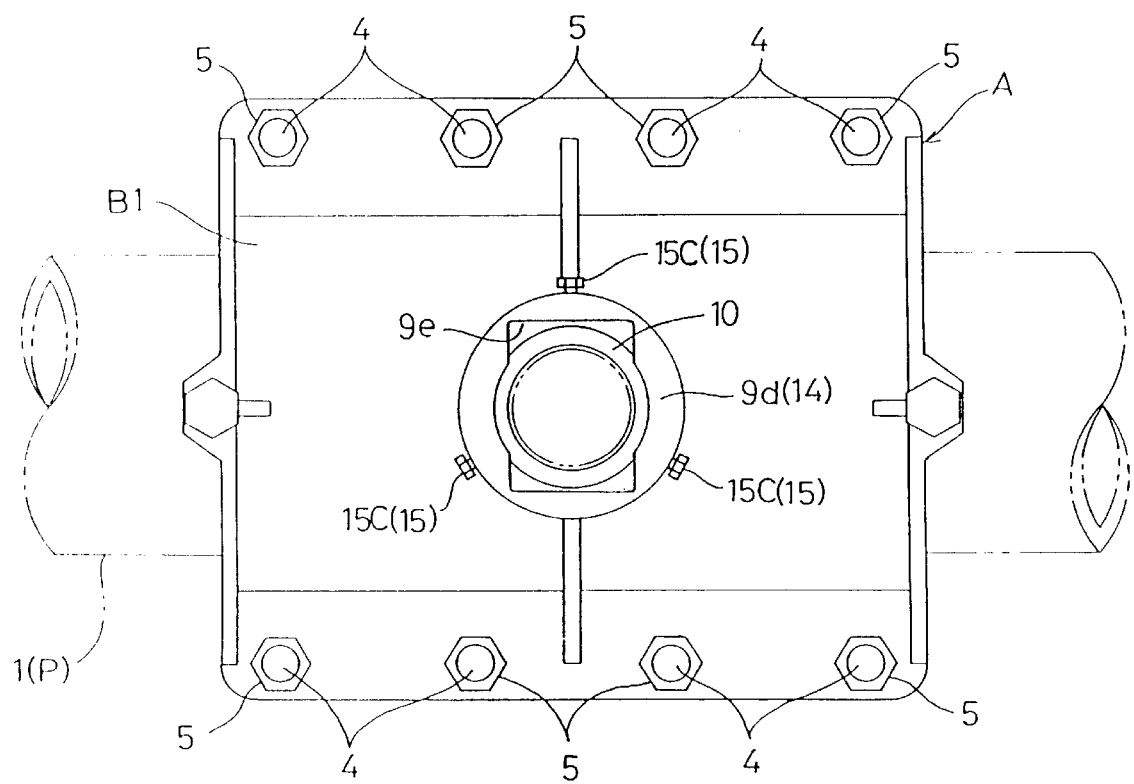
FIG. 8 is a rear view of a split joint member as viewed along a line VIII—VIII in FIG. 7.
Figure 9:
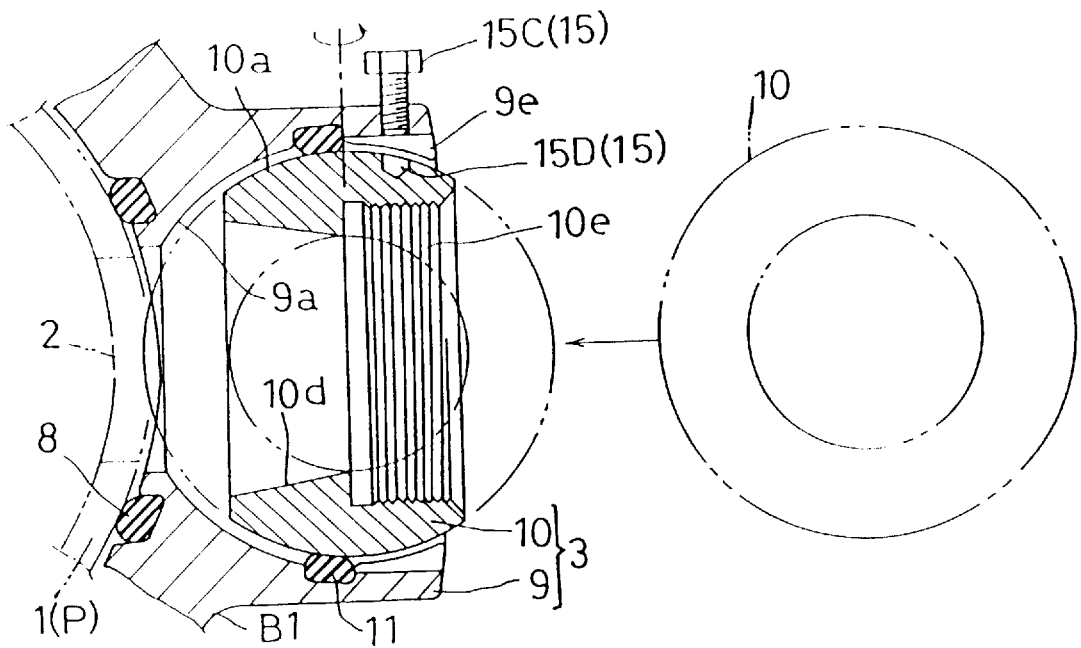
FIG. 9 is a section view showing principal portions of a movable cylindrical member illustrating an attaching operation thereof.

A fluid transport pipe joint shown in FIGS. 7 through 9 includes a joint body A made of cast iron to be connected with a fluid transport pipe P such as a water pipe formed of cast iron, and this joint body A includes two split joint members B1, B2 fitted around and along a peripheral wall 1 of the fluid transport pipe P (i.e. along the peripheral direction of the pipe). The split joint members B1, B2 are rigidly connected with each other, by means of bolts 4 and nuts 5, in a direction normal to an axis X of the fluid transport pipe P. Of these split joint members, in an inner face of the first split joint member B1 disposed in opposition to a through bore 2 defined in the pipe peripheral wall 1, there is fitted and retained an elastic sealing member 8 made of synthetic rubber material (e.g. styrene-butadiene rubber) pressed against an outer peripheral face of the pipe peripheral wall in the vicinity of the peripheral edge of the through bore 2. The first split joint member B1 includes, as an integral outer projection thereof, a cylindrical connecting portion 3 communicated with the through bore 2 in the horizontal direction normal to the axis X of the fluid transport pipe P.

The cylindrical connecting portion 3 includes a fixed cylindrical member 9 formed integral with the first split joint member B1 and a movable cylindrical member 10 formed of cast iron and three-dimensionally flexibly or pivotably connectable with the fixed cylindrical member 9. And, between the opposed connected faces of these fixed cylindrical member 9 and movable cylindrical member 10, there is interposed an elastic and annular sealing member 11 made of synthetic rubber material (e.g. styrene-butadiene rubber) for providing fluid or water-tightness therebetween.

More particularly, the movable cylindrical member 10 has a length along a pipe axis Y which length is shorter than an inside diameter of the fixed cylindrical member 9. And, an entire outer peripheral face of this movable cylindrical member 10 constitutes a partially spherical first sliding contact face 10a. Whereas, the fixed cylindrical member 9 defines, in an inner peripheral face thereof, a partially spherical second sliding contact face 9a pivotably engageable with the first sliding contact face 10a of the movable cylindrical member 10.

Further, there is provided a stopper means 14 for preventing, through contact, inadvertent withdrawal of the movable cylindrical member 10 from the fixed cylindrical member 9, while allowing pivotal flexion of the movable cylindrical member 10 relative to the fixed cylindrical member 10 along the two sliding contact faces 9a, 10a.

This stopper means 14 is constituted by an opened peripheral edge portion 9d of the fixed cylindrical member 9, which edge portion has an inside diameter shorter than the maximum diameter of the first sliding contact face 10a of the movable cylindrical member 10.

The opened peripheral edge portion 9d of the fixed cylindrical member 9 defines a cutout portion 9e which allows insertion of the movable cylindrical member 10 toward the second sliding contact face 9a only when the axis of the movable cylindrical member 10 is oriented normal to the axis of the fixed cylindrical member 9 and which also allows pivotal flexion of the movable cylindrical member 10 until the axis of the inserted movable cylindrical member 10 becomes aligned with the axis of the fixed cylindrical member 9.

Further, between the fixed cylindrical member 9 and the movable cylindrical member 10, there is releasably disposed a temporary fixing means 15 for temporarily fixing or temporarily fixing the movable cylindrical member 10 to the fixed cylindrical member 9 under the above-mentioned condition where the axis of the movable cylindrical member 10 is aligned with the axis of the fixed cylindrical member 9.

Referring more particularly to this temporary fixing means 15, at each of three peripheral positions on the fixed cylindrical member 9, there is threaded a screw member (bolt) 15C pressable, from the outer radial direction, against the first sliding contact face 10a of the movable cylindrical member 10. On the other hand, at three positions in the first sliding contact face 10a of the movable cylindrical member 10 corresponding to the leading ends of the respective screw members 15C, engaging holes 15D are defined for allowing engagement of the leading ends of the respective screw members 15C.

The inner peripheral face of the movable cylindrical member 10 includes an inner peripheral face portion 10d extending substantially half the the entire axial length of this member and extending from an axial end thereof on the side of the first split joint member B1. This inner peripheral face portion 10d is formed as a tapered face portion having an increasing diameter toward the first split joint member B1. Further, the maximum inside diameter of this tapered face portion 10d is set greater than the diameter of the through bore 2. The remaining portion of the inner peripheral face of the movable cylindrical member 10, i.e. an inner peripheral face portion 10e on the opposite side to the first split joint member B1, defines a female threaded portion for allowing threaded engagement with a sluice valve device D as an example of the external piping device.

The above-mentioned maximum inside diameter of the tapered face portion 10d is determined such that the axial end of the movable cylindrical member 10 on the side of the first split joint member B1 will not reduce the cross sectional area of the fluid flow passage extending from the through bore 2 to the movable cylindrical member 10 even when the movable cylindrical member 10 is pivotably flexed to its limit relative to the fixed cylindrical member 9 along the respective sliding contact faces 9a, 10a.

Third Embodiment

Figure 10:
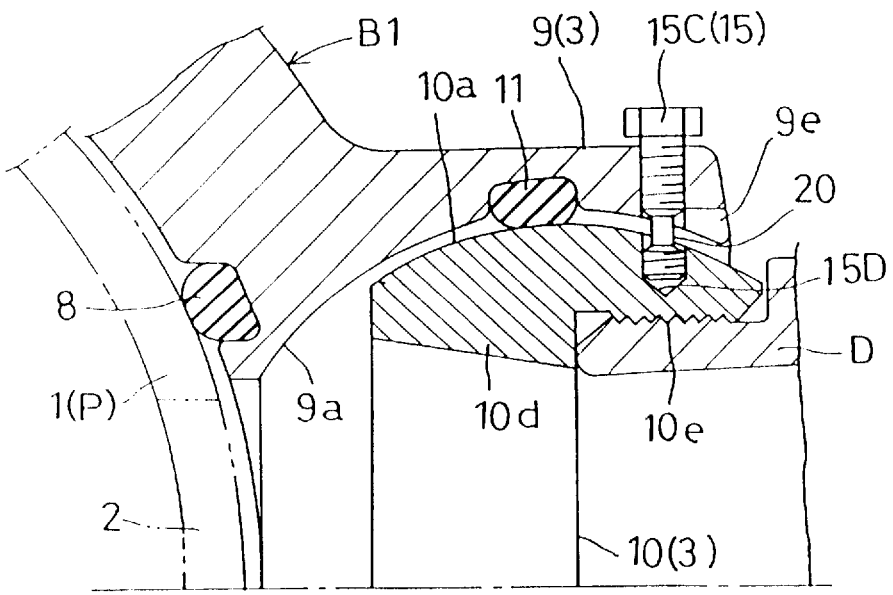
FIG. 10 is an enlarged section view showing principal portions of a fluid transport pipe joint relating to a third embodiment of the invention.

In the fluid transport pipe joint of the second embodiment, as shown in FIG. 10, each of the plurality of screw members 15C constituting the temporary fixing means 15 defines an annular groove 20 extending axially beyond a length corresponding to the gap between the second sliding contact face 9a of the fixed cylindrical member 9 and the first sliding contact face 10a of the movable cylindrical member 10. This annular groove 20 constitutes a breakable portion which is breakable, when subjected to a significant external force tending to cause relative movement between the fixed cylindrical member 9 and the movable cylindrical member 10, so as to release the temporarily fixed condition of the movable cylindrical member 10 relative to the fixed cylindrical member 9.

The rest of the construction of this embodiment is identical to that of the second embodiment.

Incidentally, in this third embodiment, the breakable portion 20 is constituted from the annular groove defined in the screw member 15C. Instead, this breakable portion 20 may be constituted by reducing the thickness of a portion of the screw member 15C, or by forming a through hole or a cutout at a portion of the screw member 15C.

In short, this breakable portion 20 may be constituted in any convenient manner as long as it may be broken, when subjected to a significant external force tending to cause relative movement between the fixed cylindrical member 9 and the movable cylindrical member 10, so as to release the temporarily fixed condition of the movable cylindrical member 10 relative to the fixed cylindrical member 9.

Fourth Embodiment

Figure 11:
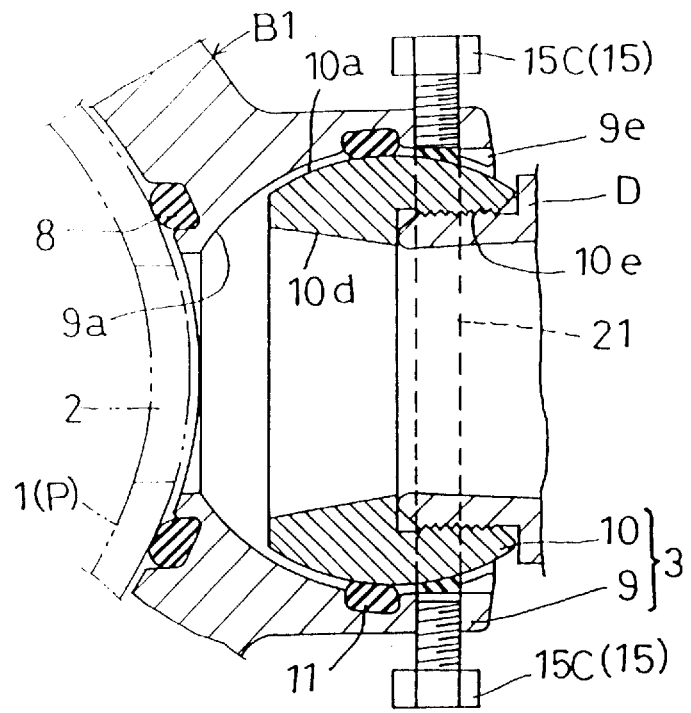
FIG. 11 is an enlarged section view showing principal portions of a fluid transport pipe joint relating to a fourth embodiment of the invention.

FIG. 11 shows an alternate embodiment of the temporary fixing means 15 provided in the fluid transport pipe joint of the second embodiment. In this, at each of three peripheral positions on the fixed cylindrical member 9, there is threaded a screw member (bolt) 15C pressable, from the outer radial direction, against the first sliding contact face 10a of the movable cylindrical member 10. Between the leading end of each screw member 15C and the first sliding contact face 10a of the movable cylindrical member 10, there is interposed an annular elastic packing element 21 made of synthetic rubber material as an example of a protector member softer than the first sliding contact face 10a, with the packing element 21 being fitted on the first sliding contact face 10a.

According to this embodiment, while the screw members 15C allow reliable temporary fixing between the movable cylindrical member 10 and the fixed cylindrical member 9, it is also possible to restrict occurrence of damage to the first sliding contact face 10a of the movable cylindrical member 10.

Moreover, the protector member 21 comprises the elastic member such as the elastic packing element described above. Thus, even if the worker forgets to release the temporarily fixed condition by operating the screw members 15C, when a significant external force is applied to the cylindrical connecting portion 3 due to an earthquake or differential settlement in the poor ground, this external force causes the movable cylindrical member 10 and the fixed cylindrical member 9 to be three-dimensionally flexed to each other via the first sliding contact face 10a and the second sliding contact face 9b defined in the respective contacting faces.

For the above reason, the construction of this embodiment can eliminate the necessity of the releasing operation of the temporarily fixed condition of the temporarily fixed screw members 15C. Accordingly, the connecting operation of the external piping device may be carried out in a more efficient manner.

The rest of the construction of this embodiment is identical to the construction of the second embodiment.

Incidentally, the protector member 21 may be formed of any other material such as synthetic resin, copper or the like which material is softer than the material forming the first sliding contact face 10a.

Fifth Embodiment

Figure 12:
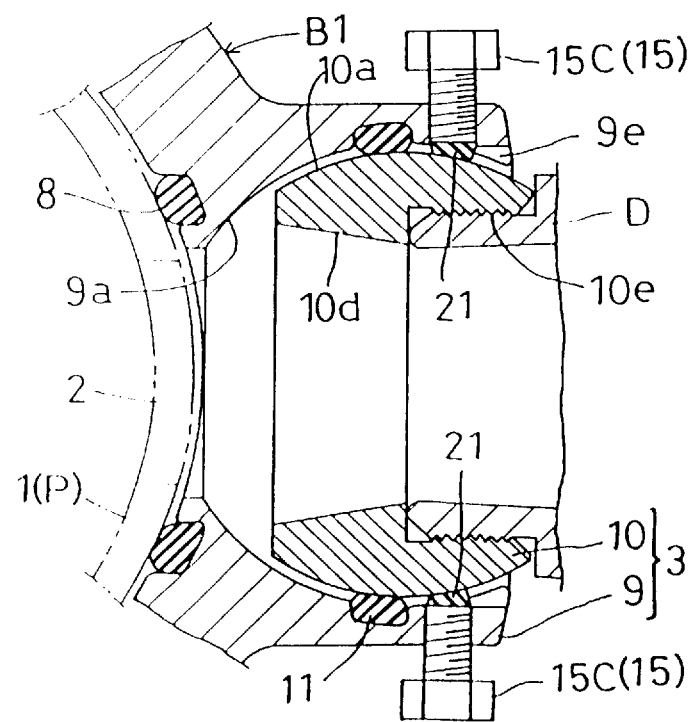
FIG. 12 is an enlarged section view showing principal portions of a fluid transport pipe joint relating to a fifth embodiment of the invention.

FIG. 12 shows a further alternate embodiment of the temporary fixing means 15 provided in the fluid transport pipe joint of the second embodiment. In this, at each of three peripheral positions on the fixed cylindrical member 9, there is threaded a screw member (bolt) 15C pressable, from the outer radial direction, against the first sliding contact face 10a of the movable cylindrical member 10. Further, to the leading end of each screw member 15C, there is affixed, by any appropriate fixing means such as baking, a protector member 21 made of e.g. synthetic rubber material softer than the and the first sliding contact face 10a of the movable cylindrical member 10.

Then, if the above protector member 21 comprises an elastic member such as the synthetic rubber material, the construction of this embodiment may achieve substantially the same effect as achieved by the construction of the forth embodiment described above.

The rest of the construction of this embodiment is identical to the construction of the second embodiment.

Sixth Embodiment

Figure 13:
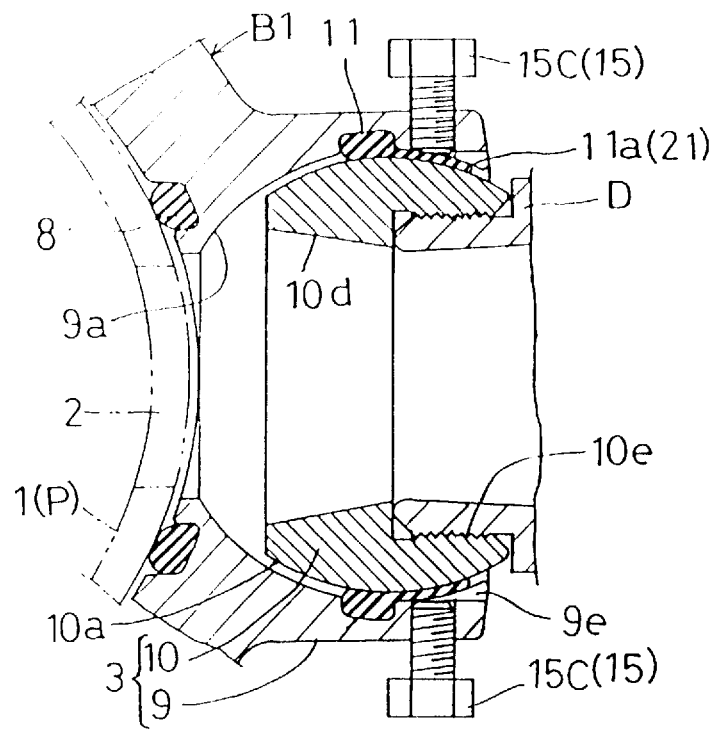
FIG. 13 is an enlarged section view showing principal portions of a fluid transport pipe joint relating to a sixth embodiment of the invention.

FIG. 13 shows a further alternate embodiment of the temporary fixing means 15 provided in the fluid transport pipe joint of the second embodiment. In this, at each of three peripheral positions on the fixed cylindrical member 9, there is threaded a screw member (bolt) 15C pressable, from the outer radial direction, against the first sliding contact face 10a of the movable cylindrical member 10. Further, between the leading end of each screw member 15C and the first sliding contact face 10a of the movable cylindrical member 10, there is extended a portion 11a of the elastic sealing member 11 for fluid-tightly sealing between the second sliding contact face 9a of the fixed cylindrical member 9 and the first sliding contact face 10a of the movable cylindrical member 10, so that this extending portion 11a of the elastic sealing member 11 acts also as the protector member 21 which is softer than the first sliding contact face 10a and which is interposed between the leading end of each screw member 15C and the first sliding contact face 10a of the movable cylindrical member 10.

Then, if the above protector member 21 comprises an elastic member such as the synthetic rubber material, the construction of this embodiment may achieve substantially the same effect as achieved by the construction of the forth embodiment described above.

The rest of the construction of this embodiment is identical to the construction of the second embodiment.

Seventh Embodiment

Figure 14:
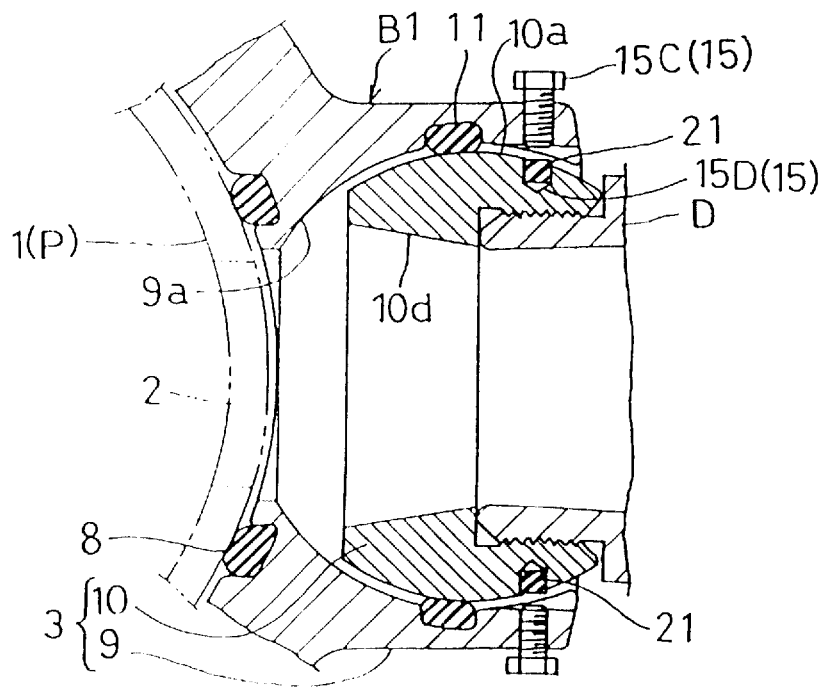
FIG. 14 is an enlarged section view showing principal portions of a fluid transport pipe joint relating to a seventh embodiment of the invention.

FIG. 14 shows a still further embodiment of the temporary fixing means 15 to be provided in the fluid transport pipe joint of the second embodiment. In this construction, an elastic member 21 made of a synthetic rubber material is inserted into the engaging hole 15D defined in the first sliding contact face 10a of the movable cylindrical member 10 for allowing insertion of the screw member (bolt) 15C.

In the case of the construction of this seventh embodiment, in the course of the temporary fixing operation, the elastic member 21 is compressed in association with the tightening operation of the screw member 15C, so that loosening of the screw member 15c may be restricted by utilizing the elastic resilience of the compressed elastic member 21.

The rest of the construction of this embodiment is identical to the construction of the second embodiment.

Incidentally, the screw member 15C of this seventh embodiment may include the breakable portion 20 of the same shape as disclosed in the third embodiment.

Eighth Embodiment

Figure 15:
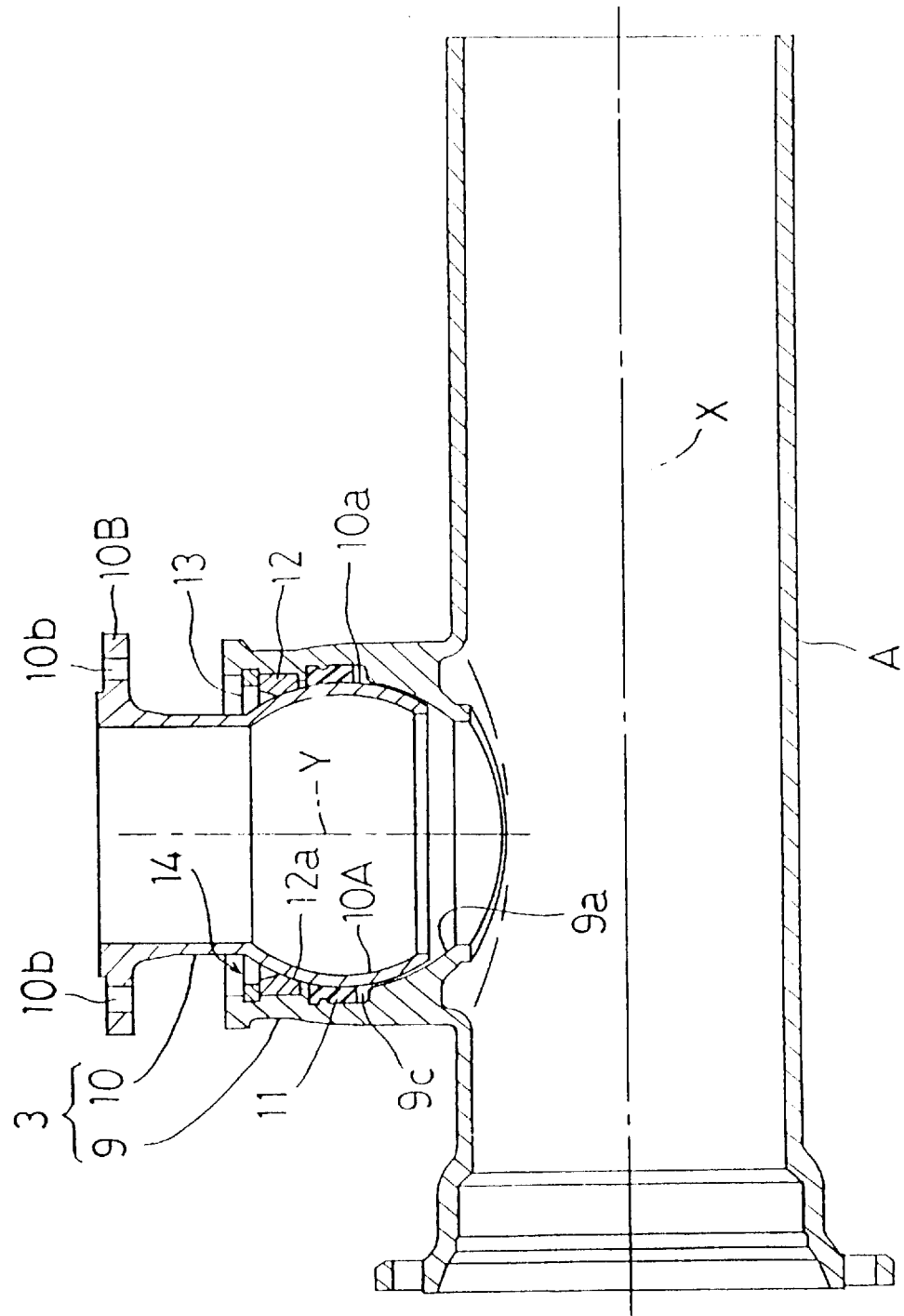
FIG. 15 is an overall section view showing a fluid transport pipe joint relating to an eighth embodiment of the invention.

In a fluid transport pipe joint shown in FIG. 15, a joint body A made of cast iron to be connected with a fluid transport pipe P made of cast iron such as a water pipe, comprises a cylindrical member capable of coaxially interconnecting opposed ends of two fluid transport pipes P. From an intermediate position of the outer peripheral face of this joint body A relative to the axis X, there is formed a cylindrical connecting portion 3 projecting outwards in the direction normal to the axis X.

This cylindrical connecting portion 3 includes a fixed cylindrical member 9 formed integral with the joint body A and a movable cylindrical member 10 formed of cast iron and connectable with the fixed cylindrical member 9 three-dimensionally flexibly relative thereto. Further, between the opposed contact faces of the fixed cylindrical member 9 and the movable cylindrical member 10, there is interposed an annular elastic sealing member 11 made of a synthetic rubber material (e.g. styrene-butadiene rubber) for fluid-tightly sealing therebetween.

More particularly, an end portion 10A of the movable cylindrical member 10 relative to the axis Y is formed as a partially spherical bulged portion extending radially outwards, so that an outer peripheral face of this spherical portion 10A provides a partially spherical first sliding contact face 10a for coming into slidable contact with a partially spherical second sliding contact face 9a formed on the inner peripheral face of the fixed cylindrical member 9. The inside diameter of the fixed cylindrical member 9 is determined so as to allow axial insertion and withdrawal of the spherical portion 10A of the movable cylindrical member 10 aligned coaxially with the axis Y of the fixed cylindrical member 9.

Further, in the inner peripheral face of the fixed cylindrical member 10, at a portion thereof on the side of the opening co-extending from the second sliding contact face 9a for coming into slidable contact with the first sliding contact face 10a of the movable cylindrical member 10, there are formed an annular sealing groove 9b for engaging and retaining the elastic sealing member 11 and an annular groove 9c for engaging and retaining a C-shaped stopper member 13. Moreover, between the elastic sealing member 11 and the stopper member 13, there is interposed a sliding contact guide member 12 made of cast iron having a partially spherical third sliding contact face 12a for coming into slidable contact with the first sliding contact face 10a of the movable cylindrical member 10.

The sliding contact guide member 12 and the stopper member 13 together constitute stopper means 14 for preventing, through contact, inadvertent withdrawal of the movable cylindrical member 10 from the fixed cylindrical member 9, while allowing the pivotal flexion of the movable cylindrical member 10 relative to the fixed cylindrical member 9 along the sliding contact faces 9a, 10a and 12a.

At the other end of the movable cylindrical member 10 relative to the axis Y, there is integrally formed a connecting flange 10B defining a plurality of coaxially arranged connecting through holes 10b for use in connection of an external piping device such as a branch pipe or a sluice valve.

Further, though not shown but as the first embodiment (see FIGS. 1 and 6), between the fixed cylindrical member 9 and the movable cylindrical member 10, there is releasably disposed a temporary fixing means 15 for temporarily fixing the movable cylindrical member 10 to the fixed cylindrical member 9, with the axes of these cylindrical members 9, 10 being aligned or substantially aligned with each other.

Ninth Embodiment

Figure 16:
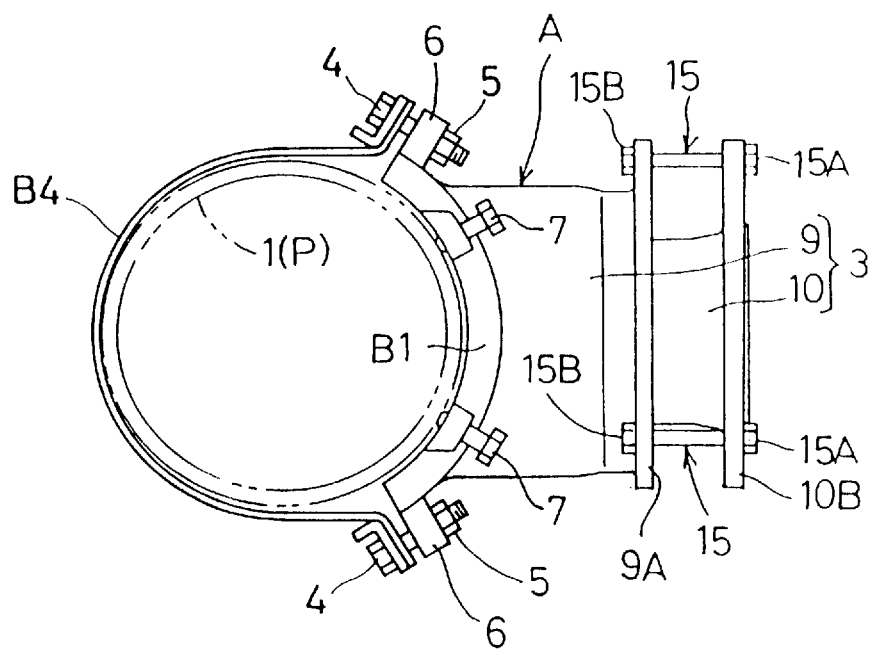
FIG. 16 is a side view showing a split joint for a fluid transport pipe joint relating to a ninth embodiment.
Figure 17:
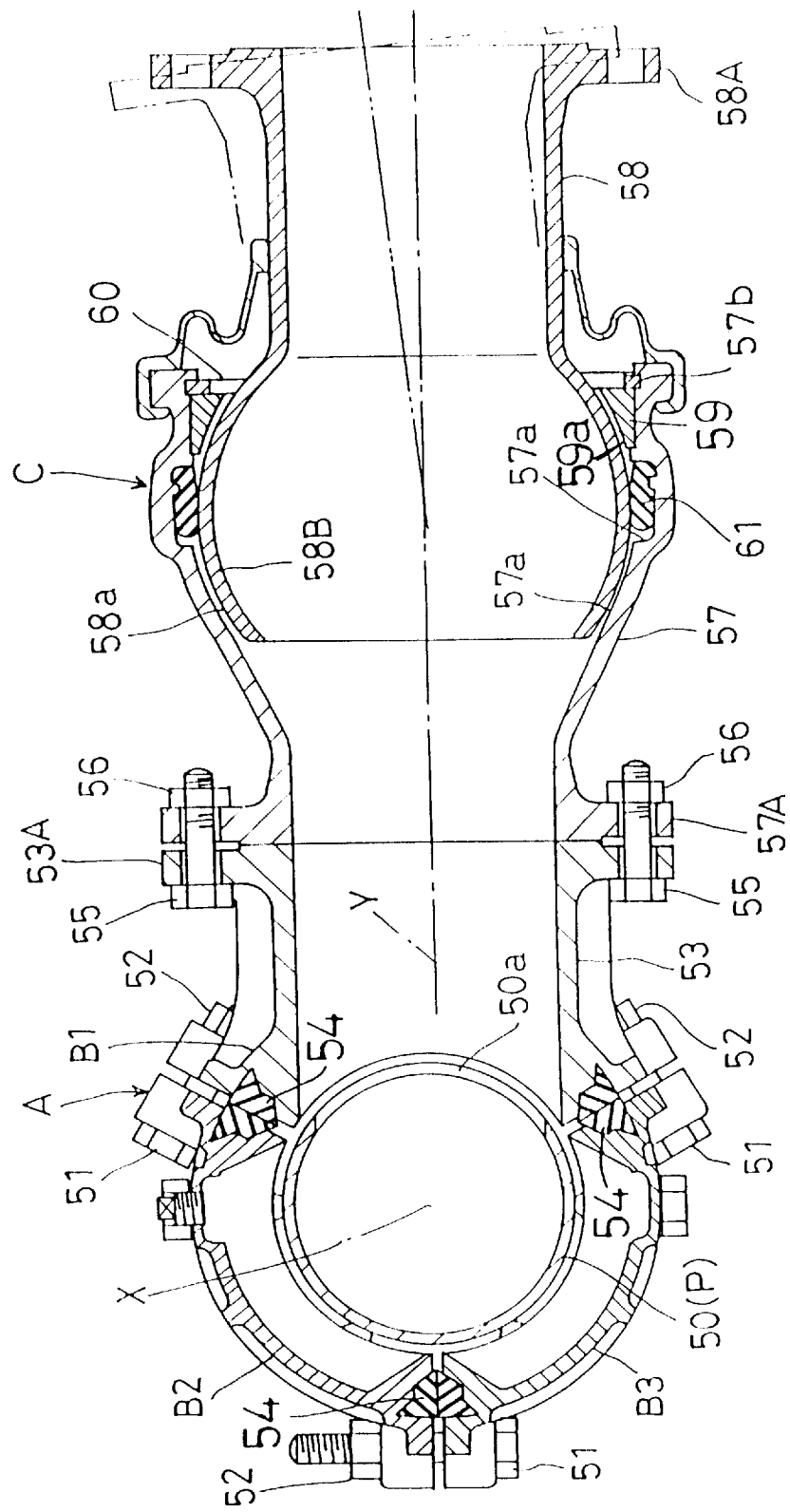
FIG. 17 is a section view showing a fluid transport pipe joint relating to the prior art as connected with a flexible joint member.

FIG. 16 shows a fluid transport pipe joint in which a joint body A made of cast iron to be connected to a fluid transport pipe P such as a water pipe made of cast iron is fixedly connected by means of a metal belt B4 fitted about and along the pipe peripheral wall 1 of the fluid transport pipe P. In this embodiment, the split type joint body of the foregoing embodiments is replaced by a simple belt member. The rest of the construction is identical with that of the embodiment 2.

Other Embodiments (1) The number of the cylindrical connecting portion 3 formed as a projection from the joint body A is not limited to one, but a plurality of the same may be provided. Further, this connecting cylindrical portion 3 may be formed as a projection extending with an inclination relative to the axis X of the joint body A, so that this portion 3 extends in a direction transversing the axis X.

Further, in the first through seventh embodiments, the joint body A is constructed from three or two split joint members. Instead, this joint body may be constructed from more than four split joint members.

(2) In the first embodiment, at an intermediate portion of the temporary fixing bolt 15A constituting the temporary fixing means 15, an annular groove (identical in shape to the annular groove 20 disclosed in the third embodiment) or a thin portion may be formed, so that this annular groove or thin portion may provide the breakable portion which is breakable, when subjected to a significant external force tending to cause relative movement between the fixed cylindrical member 9 and the movable cylindrical member 10, so as to release the temporarily fixed condition of the movable cylindrical member 10 relative to the fixed cylindrical member 9.

(3) In the respective foregoing embodiments, the three-dimensionally flexible arrangement between the fixed cylindrical member 9 and the movable cylindrical member 10 is provided by the pivotal movement therebetween along the partially spherical sliding contact faces defined in the opposed contacting faces defined in these members 9, 10. Instead, any other connecting arrangement may be employed, as long as it allows such three-dimensional flexion between the fixed cylindrical member 9 and the movable cylindrical member 10.

(4) In the respective foregoing embodiments, the fixed cylindrical member 9 and the movable cylindrical member 10 are rendered three-dimensionally flexible or pivotable, but not axially slidable relative to each other. Instead, the fixed cylindrical member 9 and the movable cylindrical member 10 may be connected to each other such that these members are not only three-dimensionally pivotable, but also axially slidable relative to each other within a predetermined range.

(5) In the respective foregoing embodiments, the connection between the fixed cylindrical member 9 and the movable cylindrical member 10 is done by inserting the latter into the former. An alternate arrangement is also conceivable in which the movable cylindrical member 10 is fitted outwardly on the fixed cylindrical member 9.

(6) In the respective foregoing embodiments, the temporary fixing by the temporary fixing means 15 is effected at three positions. The number of these temporarily fixed positions is not limited thereto, but may vary as desired.

Further, instead of using the screw member 15C, the temporary fixing is also possible by using a rotary cam or a wedge.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A fluid transport pipe joint comprising:
   a joint body including an inner peripheral face positionable in opposition to an outer peripheral face of said transport pipe between ends of said transport pipe;
   clamp means for fixing said joint body onto said outer peripheral face of the transport pipe;
   a fixed cylindrical member formed integrally on said joint body, said fixed cylindrical member extending radially outwardly of said fluid transport pipe when said joint body is fixed onto said outer peripheral face of said fluid transport pipe; and
   a movable cylindrical member pivotally connected to said fixed cylindrical member opposite said inner peripheral face of said joint body, and when disposed in opposition to a through bore defined in said peripheral wall of said transport pipe, said movable cylindrical member communicates with said through bore, wherein:
   said movable cylindrical member has a partially spherical outer peripheral face that defines a spherical imaginary surface that extends from said partially spherical outer peripheral face of said movable cylindrical member and crosses said inner peripheral face of said joint body.

2. A fluid transport pipe joint according to claim 1, wherein said partially spherical outer face of the movable cylindrical member defines a first sliding contact face;
   said fixed cylindrical member defines, in an inner peripheral face thereof, a second sliding contact face having a partially spherical shape for coming into slidable contact with said first sliding contact face; and
   stopper means is provided for preventing, through contact, inadvertent withdrawal of said movable cylindrical member from said fixed cylindrical member, while allowing said movable cylindrical member to be pivotably flexed relative to said fixed cylindrical member along said first and second sliding contact faces.

3. A fluid transport pipe joint according to claim 1, wherein said joint body includes a partially cylindrical member having said inner peripheral face, said fixed cylindrical member includes a receiving portion to pivotally receive said movable cylindrical member, and said receiving portion extends from said partially cylindrical member.

4. A fluid transport pipe joint according to claim 3, wherein said spherical imaginary surface crosses said partially cylindrical member of said joint body.

5. A fluid transport pipe joint comprising:
   a cylindrical joint body coaxially connectable with said transport pipe between ends of said transport pipe;
   a fixed cylindrical member extending from said cylindrical joint body radially outwardly of said cylindrical joint body; and
   a movable cylindrical member pivotally connected to said fixed cylindrical member, and communicating with said cylindrical joint body, wherein:
   said fixed cylindrical member includes a receiving portion for pivotally receiving said movable cylindrical member;

said receiving portion extends from said cylindrical joint body; and said movable cylindrical member has a partially spherical outer peripheral face that defines a spherical imaginary surface that extends from said partially spherical outer peripheral face of said movable cylindrical member and crosses said cylindrical joint body.

6. A fluid transport pipe joint comprising:

a joint body having an inner peripheral face positionable against an outer peripheral face of a fluid transport pipe between opposite ends thereof and coaxial with a lengthwise axis of the fluid transport pipe;

a clamp for mating the inner peripheral face of the joint body to the outer peripheral face of the fluid transport pipe;

a fixed cylindrical member formed integrally with the joint body; and a movable cylindrical member having a partially spherical outer face connectable in three-dimensionally pivotable contact with the fixed cylindrical member opposite the joint body, wherein:

the fixed cylindrical member is positionable in communication with a through bore defined in the outer peripheral face of the transport pipe;

the partially spherical outer face and the fixed cylindrical member opposite the joint body are fluid-tightly connectable so that the movable cylindrical member is in communication with the through bore in the outer peripheral face of the transport pipe via the fixed cylindrical member; and the partially spherical outer face defines a spherical imaginary face that crosses the inner peripheral face of the joint body when the partially spherical outer face and the end of the fixed cylindrical member opposite the joint body are fluid-tightly connected.

7. A fluid transport pipe joint according to claim 6, wherein the partially spherical outer face of the movable cylindrical member defines a first sliding contact face;

the fixed cylindrical member defines, in an inner peripheral face thereof, a second sliding contact face having a partially spherical shape for coming into slidable contact with the first sliding contact face; and stopper means is provided for preventing, through contact, inadvertent withdrawal of the movable cylindrical member from the fixed cylindrical member, while allowing said movable cylindrical member to be pivotably flexed relative to the fixed cylindrical member along the first and second sliding contact faces.

8. A fluid transport pipe joint according to claim 7, wherein the first sliding contact face is defined at an axial end portion of the outer peripheral face of the movable cylindrical member;

the inside diameter of the fixed cylindrical member is set so as to allow axial withdrawal of the movable cylindrical member oriented coaxially with the fixed cylindrical member;

in the inner peripheral face of the fixed cylindrical member and at a portion of the inner peripheral face co-extending from the second sliding contact face contacting the first sliding contact face of the movable cylindrical member, there are provided a sliding contact guide member having a partially spherical third sliding contact face for coming into slidable contact with the first sliding contact face of the movable cylindrical member and a stopper member for preventing, through contact, displacement of the sliding contact guide member away from the opened peripheral edge; and the sliding contact guide member and the stopper member together constitute the stopper means.

9. A fluid transport pipe joint according to claim 7, wherein the movable cylindrical member has an axial length which is shorter than an inside diameter of the fixed cylindrical member;

the movable cylindrical member has an entire outer peripheral face constituting the partially spherical first sliding contact face;

the fixed cylindrical member defines, in an inner peripheral face thereof, the partially spherical second sliding contact face rotatably engageable with the first sliding face of the movable cylindrical member;

the stopper means is constituted from an opened peripheral edge of the fixed cylindrical member having an inside diameter which is shorter than a maximum diameter of the first sliding contact face of the movable cylindrical member; and the opened peripheral edge of the fixed cylindrical member defines a cutout portion for allowing insertion of the movable cylindrical member toward the second sliding contact face only when the axis of the movable cylindrical member is oriented normal to the axis of the fixed cylindrical member and allowing the movable cylindrical member to be pivoted until the axis of the inserted movable cylindrical member comes into register with the axis of the fixed cylindrical member.

10. A fluid transport pipe joint according to claim 9, wherein an inner peripheral face of the movable cylindrical member, at least a portion thereof co-extending from the end on the side of the joint body is formed as a tapered face having a gradually increasing diameter towards the joint body; and the tapered face has a maximum inside diameter which is greater than the diameter of the through bore.

11. A fluid transport pipe joint according to claim 6, further comprising releasable temporary fixing means for temporarily fixing the movable cylindrical member to the fixed cylindrical member.

12. A fluid transport pipe joint according to claim 11, wherein the temporary fixing means effects the temporarily fixing operation with the movable cylindrical member and the fixed cylindrical member being oriented one of coaxially and substantially coaxially.

13. A fluid transport pipe joint according to claim 11, wherein the temporary fixing means includes a screw member threaded to the fixed cylindrical member, the screw member being capable of pressing the first sliding contact face of the movable cylindrical member, and the screw member includes a breakable portion which is breakable, when subjected to an external force tending to move the fixed cylindrical member and the movable cylindrical member relative to each other, so as to release the temporarily fixed condition between the movable cylindrical member and the fixed cylindrical member.

14. A fluid transport pipe joint according to claim 11, wherein the temporary fixing means includes a screw member threaded to the fixed cylindrical member, the screw member being capable of pressing the first sliding contact face of the movable cylindrical member, and a protector member interposed between a leading end of the screw member and the first sliding contact face of the movable cylindrical member, the protector member being softer than the first sliding contact face.

15. A fluid transport pipe joint according to claim 14, wherein the protector member is constituted by a portion of an elastic sealing member for fluid-tightly sealing a gap formed between the partially spherical outer and inner faces of the fixed cylindrical member and the movable cylindrical member, respectively.

16. The fluid transport joint as set forth in claim 6, further including a first elastic sealing member positioned between the partially spherical outer face and the fixed cylindrical member opposite the joint body.

17. The fluid transport joint as set forth in claim 16, further including an annular sealing groove formed in the fixed cylindrical member opposite the joint body for retaining the first elastic sealing member.

18. The fluid transport joint as set forth in claim 6, further including a stopper which prevents separation of the partially spherical outer face and the fixed cylindrical member opposite the joint body.

19. The fluid transport joint as set forth in claim 18, wherein the stopper includes:
   a sliding contact member defining a partially spherical sliding contact face which slidably receives the partially spherical outer peripheral face; and
   a stopper member which retains the sliding contact member connected to the fixed cylindrical member opposite the joint body.

20. The fluid transport joint as set forth in claim 19, further including a first elastic sealing member positioned between the partially spherical outer face and the fixed cylindrical member opposite the joint body and between the stopper and the lengthwise axis of the fluid transport pipe.

21. The fluid transport joint as set forth in claim 6, wherein the clamp includes:
   at least one joint member connectable to the joint body and around the outer peripheral face of the fluid transport pipe; and
   a second elastic sealing member disposed between the joint body and the at least one joint member for preventing leakage of fluid via the through bore.

22. The fluid transport joint as set forth in claim 6, wherein the fixed cylindrical member opposite the joint body includes a partially spherical inner face which receives the partially spherical outer face in sliding contact therewith.

23. A fluid transport pipe joint comprising:
   a cylindrical joint body coaxially connectable between opposing ends of a pair of fluid transport pipes;
   a fixed cylindrical member formed integrally on the cylindrical joint body and extending transverse to a lengthwise axis thereof;
   a movable cylindrical member having a partially spherical outer face pivotally connectable with the fixed cylindrical member opposite the cylindrical joint body, wherein:
      the movable cylindrical member and the cylindrical joint body are in communication; and
      the partially spherical outer face defines a spherical imaginary face that crosses an inner peripheral face of the cylindrical joint body.

* * * * *

UNITED STATES PATENT AND TRADEMARK OFFICE
CERTIFICATE OF CORRECTION

PATENT NO. : 5,806,896
DATED : September 15, 1998
INVENTOR(S) : Taichi Sato et al.

It is certified that error appears in the above-identified patent and that said Letters Patent is hereby corrected as shown below:

On the Title Page, refer to [75] Inventors, second inventor's city: "Aeyagawa" should read --Neyagawa--.

On the Title Page, refer to [75] Inventors, third inventor's city: "Seita" should read --Suita--.

On the Title Page, refer to [73] Assignee, "Sato et al." should read --Yano Giken Co., Ltd.--.

Column 3 Line 22, after "each other" delete ". The" and insert --, the--.

Column 4 Line 50, "member. So that, the" should read --member, so that the--.

Column 5 Line 2 "contat" should read --contact--.

Column 5 Line 25 "appended claim 4" should read --appended claim 7--.

Column 5 Line 59 "these member" should read --these members--.

Column 8 Line 8 delete --, there are formed,--.

Column 8 Line 30 "member" should read --members--.

Column 8 Line 45 after "cylindrical member 9" insert --, preferably at an end thereof opposite the inner peripheral face of the first split joint member B1--.

Column 9 Line 27 delete --or temporarily fixing--.

Column 10 Line 2 "rotary cuter" should read --rotary cutter--.

Column 11 Line 32 "half the the" should read --half the--.

UNITED STATES PATENT AND TRADEMARK OFFICE
CERTIFICATE OF CORRECTION

PATENT NO. : 5,806,896
DATED : September 15, 1998
INVENTOR(S) : Taichi Sato et al.

It is certified that error appears in the above-identified patent and that said Letters Patent is hereby corrected as shown below:

Column 13 Line 9 after "than the" delete --and the--.

Column 13 Line 14 "forth" should read --fourth--.

Column 13 Line 43 "forth" should read --fourth--.

Column 13 Line 60 "15c" should read --15C--.

Claim 1 Column 16 Line 12 "said" should read --a--.

Claim 1 Column 16 Line 14 before "clamp" insert --a--.

Claim 1 Column 16 Line 15 "the transport" should read --said transport--.

Claim 1 Column 16 Line 24 "said peripheral" should read --a peripheral--.

Claim 2 Column 16 Line 41 before "stopper" insert --a--.

Claim 5 Column 16 Lines 57-58 "said transport" should read --a transport--.

Claim 6 Column 17 Line 36 "the end" should read --an end--.

Claim 7 Column 17 Line 45 "before "stopper" insert --a--.

Claim 8 Column 17 Line 55 "the inside" should read --an inside--.

Claim 8 Column 18 Line 2 "the opened" should read --an opened--.

Claim 8 Column 18 Line 2 after "peripheral edge" and before the semicolon insert --of the fixed cylindrical member--.

UNITED STATES PATENT AND TRADEMARK OFFICE
CERTIFICATE OF CORRECTION

PATENT NO.   : 5,806,896
DATED        : September 15, 1998
INVENTOR(S)  : Taichi Sato et al.

It is certified that error appears in the above-identified patent and that said Letters Patent is hereby corrected as shown below:

Claim 9 Column 18 Line 12 "an inner" should read --said inner--.

Claim 9 Column 18 Line 14 after "sliding" insert --contact--.

Claim 9 Column 18 "the axis" should read --an axis--.

Claim 9 Column 18 Line 27 "the axis" should read --an axis--.

Claim 10 Column 18 Line 31 after "wherein" insert --of--.

Claim 10 Column 18 Line 32 "the end" should read --an end--.

Claim 10 Column 18 Line 33 "the side" should read --a side--.

Claim 10 Column 18 Line 36 "the diameter" should read --a diameter--.

Claim 11 Column 18 Line 38 before "releasable" insert --a--.

Claim 13 Column 18 Line 50 after "member" delete comma --,--.

Signed and Sealed this

Third Day of April, 2001

Attest:

NICHOLAS P. GODICI

*Attesting Officer*    *Acting Director of the United States Patent and Trademark Office*